(12) United States Patent
Wang et al.

(10) Patent No.: US 11,500,870 B1
(45) Date of Patent: Nov. 15, 2022

(54) FLEXIBLE QUERY EXECUTION

(71) Applicant: INTERNATIONAL BUSINESS MACHINES CORPORATION, Armonk, NY (US)

(72) Inventors: Xiaobo Wang, Beijing (CN); Shuo Li, Beijing (CN); Sheng Yan Sun, Beijing (CN); Xin Peng Liu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/448,979

(22) Filed: Sep. 27, 2021

(51) Int. Cl.
*G06F 16/2455* (2019.01)
*G06F 16/2453* (2019.01)

(52) U.S. Cl.
CPC .... *G06F 16/24545* (2019.01); *G06F 16/2455* (2019.01); *G06F 16/24535* (2019.01)

(58) Field of Classification Search
CPC ........... G06F 16/24545; G06F 16/2455; G06F 16/24535
USPC ........................................................ 707/720
See application file for complete search history.

(56) References Cited

U.S. PATENT DOCUMENTS

| | | | | |
|---|---|---|---|---|
| 6,108,662 | A * | 8/2000 | Hoskins | G06Q 10/06 707/999.102 |
| 6,502,102 | B1 * | 12/2002 | Haswell | G06F 11/3664 707/999.102 |
| 6,701,514 | B1 * | 3/2004 | Haswell | G06F 11/3664 717/124 |
| 6,907,546 | B1 * | 6/2005 | Haswell | G06F 11/3684 717/124 |
| 8,914,606 | B2 * | 12/2014 | Culter | G06F 9/5077 711/E12.078 |
| 11,095,743 | B2 * | 8/2021 | Yellin | H04L 67/10 |
| 11,243,811 | B1 * | 2/2022 | Jiang | G06F 9/5005 |
| 11,308,066 | B1 * | 4/2022 | Li | G06F 16/2282 |
| 2006/0206507 | A1 * | 9/2006 | Dahbour | G06F 16/9024 |
| 2008/0071755 | A1 * | 3/2008 | Barsness | G06F 16/284 |
| 2009/0012932 | A1 * | 1/2009 | Romem | G06F 16/24535 |

(Continued)

OTHER PUBLICATIONS

Anonymous; SQL Access Path Training for Machine Learning with Reduced Resource Consumption; IP.com IPCOM000260921D; Jan. 8, 2020; 6 pages.

(Continued)

*Primary Examiner* — Hanh B Thai
(74) *Attorney, Agent, or Firm* — Schmeiser, Olsen & Watts, LLP; Stephanie Carusillo

(57) ABSTRACT

An approach is provided for optimizing a system resource of a cloud database. Components of a database system are divided into micro-systems according to functions and execution levels. A cluster analysis of the micro-systems and an analysis of workload patterns are performed. Different combinations of the micro-systems are generated. Images of the micro-systems and of the different combinations of the micro-systems are generated. A query is received and analyzed at a current layer specifying a set of micro-systems specified by a function of the database system. Service(s) associated with micro-system(s) specified by next layer(s) are pre-loaded and activated. A partial execution of the query is performed and a result of the query is generated at a selected edge or client side, where the selection is based on the analysis of the workload patterns.

20 Claims, 11 Drawing Sheets

(56) References Cited

U.S. PATENT DOCUMENTS

| | | | |
|---|---|---|---|
| 2010/0052112 A1* | 3/2010 | Rogers | B81B 7/0093 438/584 |
| 2013/0110873 A1* | 5/2013 | Romem | G06F 11/18 707/771 |
| 2014/0279920 A1* | 9/2014 | Madhavarapu | G06F 16/2358 707/649 |
| 2016/0098471 A1 | 4/2016 | Weidner | |
| 2016/0110408 A1* | 4/2016 | Madhavarapu | G06F 16/2358 707/615 |
| 2019/0230186 A1* | 7/2019 | Yellin | H04L 67/5683 |
| 2019/0251204 A1* | 8/2019 | Bedadala | G06F 16/34 |
| 2020/0073987 A1* | 3/2020 | Perumala | G06F 16/24545 |
| 2020/0327124 A1* | 10/2020 | Rosen | G06F 16/24542 |
| 2020/0334232 A1* | 10/2020 | Arye | G06F 16/215 |
| 2020/0334254 A1* | 10/2020 | Arye | G06F 16/2393 |
| 2021/0216572 A1* | 7/2021 | Braghin | G06F 16/215 |
| 2021/0357256 A1* | 11/2021 | Cao | G06F 9/5011 |
| 2022/0019589 A1* | 1/2022 | May | G06F 16/217 |
| 2022/0067044 A1* | 3/2022 | Li | G06F 11/2023 |

OTHER PUBLICATIONS

Behara, Samir; Breaking the Monolithic Database in Your Microservices Architecture; https://dzone.com/articles/breaking-the-monolithic-database-in-your-microserv; Sep. 12, 2018 5 pages.

Fields, Kaslin; Running a MySQL Database in Containers—The Right Way; https://blogs.oracle.com/cloudnative/running-a-mysql-database-in-containers-the-right-way; Oct. 24, 2018; 5 pages.

Mell, Peter et al.; "The NIST Definition of Cloud Computing;" National Institute of Standards and Technology; Special Publication 800-145; Sep. 2011; 7 pages.

Nehme, Rimma et al.; Automated Partitioning Design in Parallel Database Systems; Proceedings of the 2011 ACM SIGMOD International Conference on Management of Data; Jun. 2011; pp. 1137-1148.

Yin, Shaoyi et al.; Resource Allocation for Query Optimization in Data Grid Systems: Static Load Balancing Strategies; 17th East-European Conference on Advances in Databases and Information Systems; Sep. 2013; pp. 316-329.

* cited by examiner

US 11,500,870 B1

FLEXIBLE QUERY EXECUTION

BACKGROUND

The present invention relates to optimizing a system resource of a database, and more particularly to optimizing a system resource of a cloud database for which a workload pattern is stable.

A service based on a cloud computing environment benefits from the relatively cheaper but higher performance system resources of cloud capacity. A database system is an example of a system that leverages such capacity from a cloud computing environment. The more system resources the database takes up from the cloud platform, the more expenses the enterprise is willing to pay.

SUMMARY

In one embodiment, the present invention provides a computer system that includes a central processing unit (CPU), a memory coupled to the CPU, and one or more computer readable storage media coupled to the CPU. The one or more computer readable storage media collectively contain instructions that are executed by the CPU via the memory to implement a method of optimizing a system resource of a cloud database where workload patterns are stable. The method includes the computer system dividing components of a database system into micro-systems according to functions and execution levels of the database system. The components are divided into respective multiple micro-systems. The method further includes the computer system performing a cluster analysis of the micro-systems and an analysis of SQL workload patterns. The method further includes, based on the cluster analysis and the analysis of SQL workload patterns, the computer system generating different combinations of the micro-systems. The method further includes the computer system generating images of the micro-systems and of the different combinations of the micro-systems. The method further includes the computer system receiving an SQL query and analyzing the SQL query at a current layer specifying a set of micro-systems specified by a function of the database system. The method further includes the computer system pre-loading and activating one or more services associated with one or more micro-systems specified by one or more next layers. The method further includes the computer system performing a partial execution of the SQL query and generating a result of the SQL query at an edge side or at a client side. A selection of the edge side or the client side for performing the partial execution of the SQL query and for generating the result of the SQL query is based on the analysis of the SQL workload patterns.

A computer program product and a method corresponding to the above-summarized computer system are also described and claimed herein.

DETAILED DESCRIPTION

Overview

Figure 1:
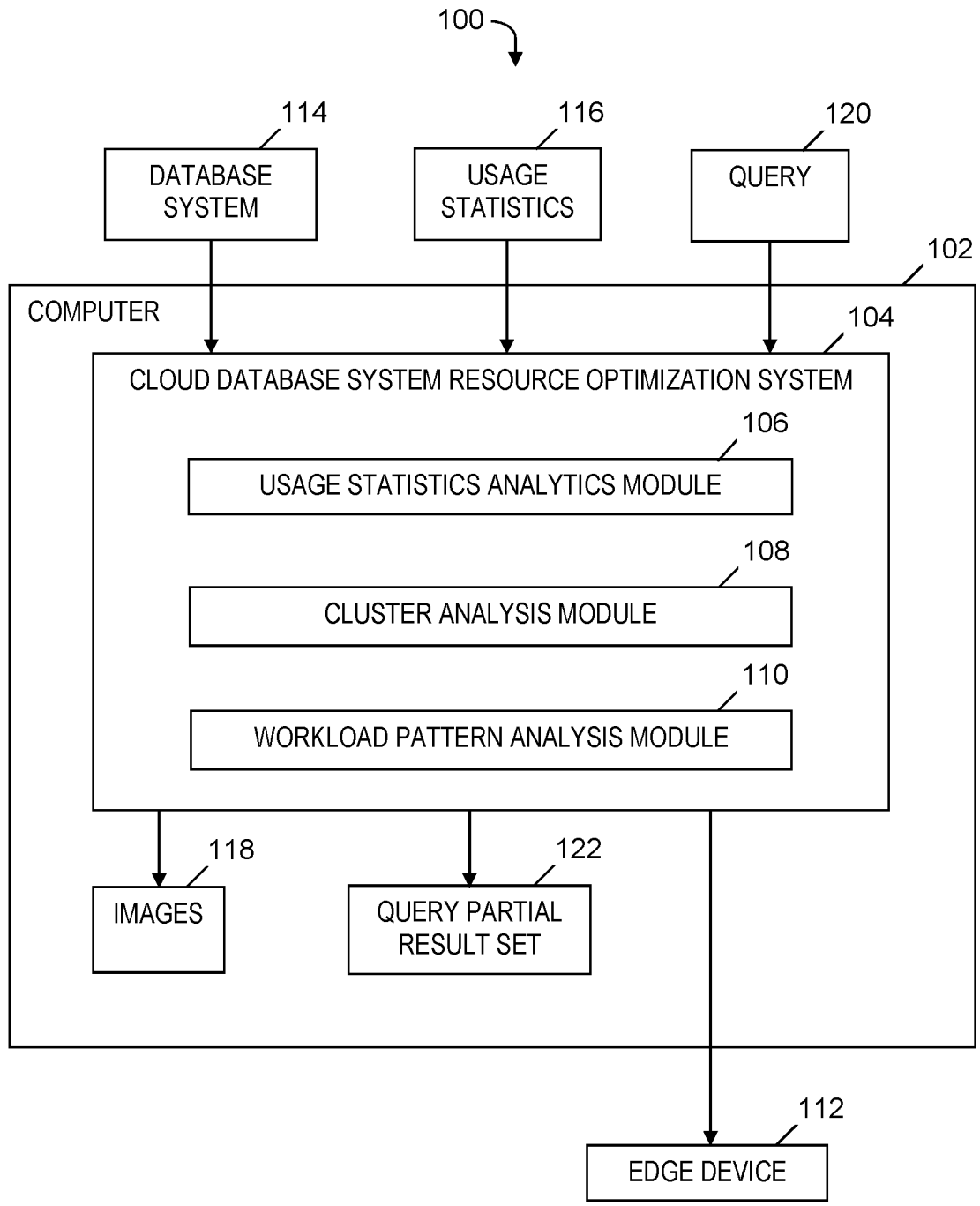
FIG. 1 is a block diagram of a system for optimizing a system resource of a cloud database where workload patterns are stable, in accordance with embodiments of the present invention.

Leveraging the capacity of a cloud computing environment only provides another platform where a database survives, but does not relieve the internal difficulties of the database (i.e., problems still exist for the database even if a simple SQL query is executed). Although there is some internal optimization solution on database SQL processing, its effect is minimal because a database is complex with many dependency modules to be run at the same time. There is a cost of many system resources for SQL query processing in a database internally. In the cloud computing environment, it is difficult to request all users to have sufficient skill to obtain extra performance.

As workload grows dramatically, the center data server fails to handle the growing amount of data. Conventional distribution database approaches address the aforementioned growing data problem, but over time, the communication cost of the distribution database nodes increases. Conventional elastic computing isolates a computing layer and a storage layer and provides dynamic extension or shrink against computing nodes and storage nodes, but the granularity is broad and cannot be controlled.

Embodiments of the present invention address the aforementioned unique challenges by providing flexibility in the execution of queries and optimizing system resources for a cloud database, in cases in which workload patterns are stable. Embodiments of the present invention divide a database system into multiple micro-systems according to functions, where each micro-system is built as an image and loaded into a container for execution as needed, and where multiple micro-systems are bundled into one image in terms of a SQL workload pattern to optimize system performance. Embodiments of the present invention pre-load micro-system images asynchronously to enhance system performance based on previous micro-system cluster analysis and SQL execution signatures probability. Embodiments of the present invention define performance architecture for calculating the benefit to system performance, build up a query relation graph to determine which side is the best performance candidate, and build up a query function protocol for partial query relation graph execution.

Embodiments of the present invention provide (i) a performance monitor module and a communication module to detect local resource pressure and database server pressure (i.e., determine a measure of demand for usage of local resources for calculations related to an execution of a database query and detect a measure of demand for usage of a database server for the calculations); (ii) an optimizer module to decide how to divide up execution queries and how to perform the execution of the divided up queries; and (iii) a database runtime to communicate with the database server for information about execution of database queries and to work with the database server to achieve the result set together, where (i), (ii), and (iii) listed above transfer the calculation pressure to the edge side to enlarge the query execution capability.

In one embodiment, a database system resource optimization system leverages system resources among multi-tenant on a cloud database and improves database performance. In one embodiment, the database system resource optimization system allows a developer in agile development to focus on function development, instead of database performance.

System for Optimizing System Resources for a Database

FIG. 1 is a block diagram of a system 100 for optimizing a system resource of a cloud database where workload patterns are stable, in accordance with embodiments of the present invention. System 100 includes a computer 102 that includes a software-based cloud database system resource optimization system 104, which includes a usage statistics analytics module 106, a cluster analysis module 108, and a workload pattern analysis module 110.

System 100 also includes an edge device 112 and a database system 114, which are operatively coupled to computer 102. In one embodiment, computer 102 and database system 114 reside in a cloud computing environment.

Cloud database system resource optimization system 104 divides components of database system 114 into multiple micro-systems according to database execution levels and database functions (e.g., parser, query transformation, access path selection, runtime execution, index manager, data manager, and buffer manager). Usage statistics analytics module 106 receives and analyzes usage statistics 116 to determine the aforementioned database execution levels. Usage statistics analytics module 106 also uses the usage statistics 116 to determine the most commonly used combinations of micro-systems.

Cluster analysis module 108 performs a cluster analysis of the micro-systems and the combinations of micro-systems. Cloud database system resource optimization system 104 generates images 118 of the micro-systems. Based on the cluster analysis, cloud database system resource optimization system 104 triggers SQL modularization to combine micro-systems together. Cloud database system resource optimization system 104 pre-loads the images asynchronously to enhance database performance based on the cluster analysis.

Cloud database system resource optimization system 104 bundles several micro-systems together into a single image in terms a SQL workload pattern, as determined and analyzed by workload pattern analysis module 110.

Cloud database system resource optimization system 104 defines an application-database performance architecture for a calculation of a performance benefit for an execution of a query 120 of database system 114.

Cloud database system resource optimization system 104 generates a query relation graph for query 120 to determine which side (i.e., application side or database side) is the best performance candidate.

Cloud database system resource optimization system 104 generates a query function protocol for partial query relation graph execution for query 120.

Cloud database system resource optimization system 104 generates a partial execution of query 120 and a query partial result set 122 for query 120 at an edge side or client side, depending on a workload pattern analysis performed by workload pattern analysis module 110.

The functionality of the components shown in FIG. 1 is described in more detail in the discussion of FIG. 2, FIG. 3, FIG. 4, FIG. 5, FIG. 6, FIG. 7, FIG. 8, FIG. 9, and FIG. 10 presented below.

Process for Optimizing System Resources for a Database

Figure 2:
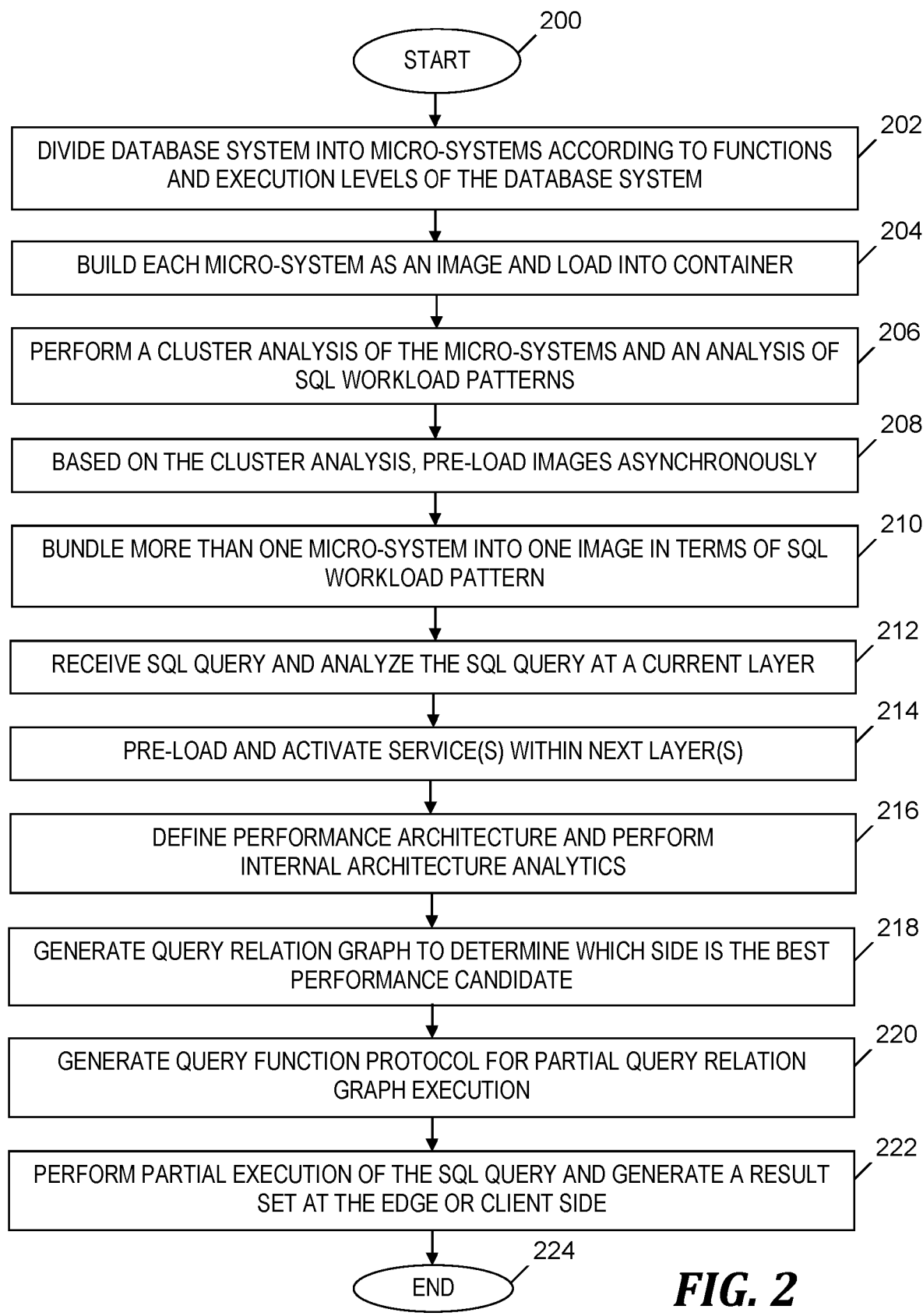
FIG. 2 is a flowchart of a process of optimizing a system resource of a cloud database where workload patterns are stable, in accordance with embodiments of the present invention.

FIG. 2 is a flowchart of a process of optimizing a system resource of a cloud database where workload patterns are stable, in accordance with embodiments of the present invention. The process of FIG. 2 begins at a start node 200. In step 202, cloud database system resource optimization system 104 (see FIG. 1) divides components of database system 114 (see FIG. 1) into micro-systems according to functions and execution levels of database system 114 (see FIG. 1). In one embodiment, the components are divided into respective sets of micro-systems, where each set includes multiple micro-systems. In one embodiment, cloud database system resource optimization system 104 (see FIG. 1) divides the components of database system 114 (see FIG. 1) into the micro-systems based on an analysis of actual usage statistics (i.e., usage statistics 116 (see FIG. 1)) performed by usage statistics analytics module 106 (see FIG. 1). Instead of an entire component of database system 114 (see FIG. 1) processing an SQL query (i.e., query 120 (see FIG. 1)), cloud database system resource optimization system 104 (see FIG. 1) employs micro-system(s) within the component to process the SQL query.

In one embodiment, the components whose functions determine the aforementioned micro-systems include parser, query transformation, access path selection, runtime execution, index manager, data manager, and buffer manager.

In step 204, cloud database system resource optimization system 104 (see FIG. 1) builds the aforementioned micro-systems as respective images and loads the images into a containers for execution. Using the actual usage statistics 116 (see FIG. 1), cloud database system resource optimization system 104 (see FIG. 1) obtains the most commonly used combinations of micro-systems that provide high efficiency in query execution.

In step 206, cluster analysis module 108 (see FIG. 1) performs a cluster analysis of the micro-systems and workload pattern analysis module 110 (see FIG. 1) performs an analysis of SQL workload patterns.

In step 208, based on the cluster analysis performed in step 206, cloud database system resource optimization system 104 (see FIG. 1) pre-loads one or more images asynchronously, where the one or more images were built in step 204. The pre-loading of the image(s) enhances the performance of an execution of the SQL query. In one embodiment, the enhanced performance is based on the cluster analysis performed by cluster analysis module 108 (see FIG. 1) and an SQL execution signatures probability.

In one embodiment, cloud database system resource optimization system 104 (see FIG. 1) identifies first combinations and second combinations of micro-systems, where the first combinations are deployed to the database edge and the second combinations are deployed to the database client or near the data source.

In step 210, cloud database system resource optimization system 104 (see FIG. 1) bundles a combination of more than one of the micro-systems into a single image in terms of the analysis of the SQL workload patterns performed in step 206, which optimizes performance of database system 114 (see FIG. 1). In one embodiment, step 210 is repeated to bundle multiple combinations of micro-systems into respective single images based on the SQL workload patterns.

In one embodiment, a bundled combination of micro-systems includes micro-systems at different layers of database system 114 (see FIG. 1). For example, first and second micro-systems bundled in an image are included in a parser component and a third micro-system bundled in the same image is included in a query transformation component.

In one embodiment, cloud database system resource optimization system 104 (see FIG. 1) combines micro-systems together in response to a triggering by SQL modularization and based on the cluster analysis performed in step 206.

In step 212, cloud database system resource optimization system 104 (see FIG. 1) receives an SQL query (i.e., query 120 in FIG. 1) and analyzes the SQL query at a current layer of database system 114 (see FIG. 1), where the current layer specifies a set of micro-systems specified by a function of database system 114 (see FIG. 1) (i.e., the current layer specifies one of the aforementioned components of the database system 114 (see FIG. 1)).

In step 214, cloud database system resource optimization system 104 (see FIG. 1) pre-loads and activates service(s) associated with one or more micro-systems specified by one or more next layers in database system 114 (see FIG. 1). The one or more next layers specify respective one or more other components of the database system 114 (see FIG. 1). The pre-loaded and activated service(s) are service(s) that are likely to be used within a next layer, as determined by the analysis in step 212. In one embodiment, an event processor performs the pre-loading and activating of the service(s) and is triggered with SQL modularization.

In one embodiment, cloud database system resource optimization system 104 (see FIG. 1) pre-loads and activates intelligent images via adding probability; e.g., using a method such as Naïve Bayes by considering time and SQL schema as the input feature.

In step 216, cloud database system resource optimization system 104 (see FIG. 1) defines a performance architecture and performs internal architecture analytics on an execution of the SQL query for a calculation of a benefit to a performance of the execution. In one embodiment, the performance architecture includes application remote and application local levels (i.e., database outside levels); outline code and inline code levels (i.e., database interact levels); and runtime node level and query level (i.e., database internal levels). In one embodiment, based on the internal architecture analytics, cloud database system resource optimization system 104 (see FIG. 1) combines functions of the SQL query on an internal query level of the performance architecture.

In one embodiment, based on the internal architecture analytics, cloud database system resource optimization system 104 (see FIG. 1) determines that the functions of another SQL query cannot be combined on the internal query level. In response to the determination that the functions of the other SQL query cannot be combined, cloud database system resource optimization system 104 (see FIG. 1) presents the functions of the other SQL query as runtime nodes on a runtime node level of the performance architecture.

In one embodiment, based on the internal architecture analytics, cloud database system resource optimization system 104 (see FIG. 1) determines that functions of the SQL query can be translated into runtime nodes and determines that a function in the SQL query is small (i.e., has a level of complexity that does not exceed a specified threshold amount). In response to determining that the functions can be translated into runtime nodes and determining that the function has the level of complexity that does not exceed the threshold amount, cloud database system resource optimization system 104 (see FIG. 1) sets, at an inline code level of the performance architecture, inline execution code for the function in the same address space in which runtime execution code of the database system 114 (see FIG. 1) resides.

In one embodiment, based on the internal architecture analytics, cloud database system resource optimization system 104 (see FIG. 1) determines that functions of the SQL query can be translated into runtime nodes and determines that a function in the SQL query is complex (i.e., has a level of complexity that exceeds a specified threshold amount). In response to determining that the functions can be translated into runtime nodes and determining that the function has the level of complexity that exceeds the threshold amount, cloud database system resource optimization system 104 (see FIG. 1) sets, at an outline code level of the performance architecture, inline execution code for the function in allied address space, which is different from the address space in which runtime execution code of the database system 114 (see FIG. 1) resides.

In one embodiment, based on the internal architecture analytics, cloud database system resource optimization system 104 (see FIG. 1) determines that a function of the SQL query can be translated into a runtime node and the function needs a parameter from the application or a real-time data interaction. In response to determining that the function can be translated into a runtime node and determining that the function needs the parameter from the application or the real-time data interaction, cloud database system resource optimization system 104 (see FIG. 1) sets inline execution code for the function in allied address space and sets a parameter request and a parameter return for passing the requested parameter in an application local (i.e., application logic) level of the performance architecture.

In step 218, cloud database system resource optimization system 104 (see FIG. 1) generates a query relation graph to determine which side is the best performance candidate (i.e., the edge side or the client side). Within different business and execution performance requirements, cloud database system resource optimization system 104 (see FIG. 1) selects a different level to perform query execution structure modification.

In one embodiment, cloud database system resource optimization system 104 (see FIG. 1) divides the SQL query (i.e., query 120 in FIG. 1) into sections, which are execution units. Cloud database system resource optimization system 104 (see FIG. 1) generates a query relation graph whose nodes are the execution units and which includes a representation of relationships between the sections. Cloud database system resource optimization system 104 (see FIG. 1) generates sub-query relation graphs based on the relationships. Based on the sub-query relation graphs, cloud database system resource optimization system 104 (see FIG. 1) determines deep relationships. A different sub-query relation graph can modify an execution sequence of query 120 (see FIG. 1) with a dependence relationship.

In step 220, cloud database system resource optimization system 104 (see FIG. 1) generates a query function protocol for partial database execution of the partial query relation graph (i.e., partial query relation graph execution).

In one embodiment, cloud database system resource optimization system 104 (see FIG. 1) determines an execution sequence within the query relation graph and sub-query relation graph and uses the query function protocol to perform the execution sequence of query 120 (see FIG. 1).

In one embodiment, the query function protocol allows for the database to return in advance in response to execution errors.

In step 222, cloud database system resource optimization system 104 (see FIG. 1) performs partial execution of the SQL query and generates query partial result set 122 (see FIG. 1) of the SQL query at the edge side or the client side. Prior to step 222, cloud database system resource optimization system 104 (see FIG. 1) selects the edge side or the client side for performing the partial execution of the SQL query and for the generation of the query partial result set 122 (see FIG. 1) based on the analysis of the SQL workload patterns provided by workload pattern analysis module 110 (see FIG. 1) (i.e., combines frequently used functions into one image and switches or loads dynamically according to the workload pattern analysis provided by workload pattern analysis module 110 (see FIG. 1)).

In one embodiment, cloud database system resource optimization system 104 (see FIG. 1) pushes some execution and partial result set 122 (see FIG. 1) to the edge side or the near the data source side with a query relation graph plan.

After step 222, the process of FIG. 2 ends at an end node 224.

Examples

Figure 3:
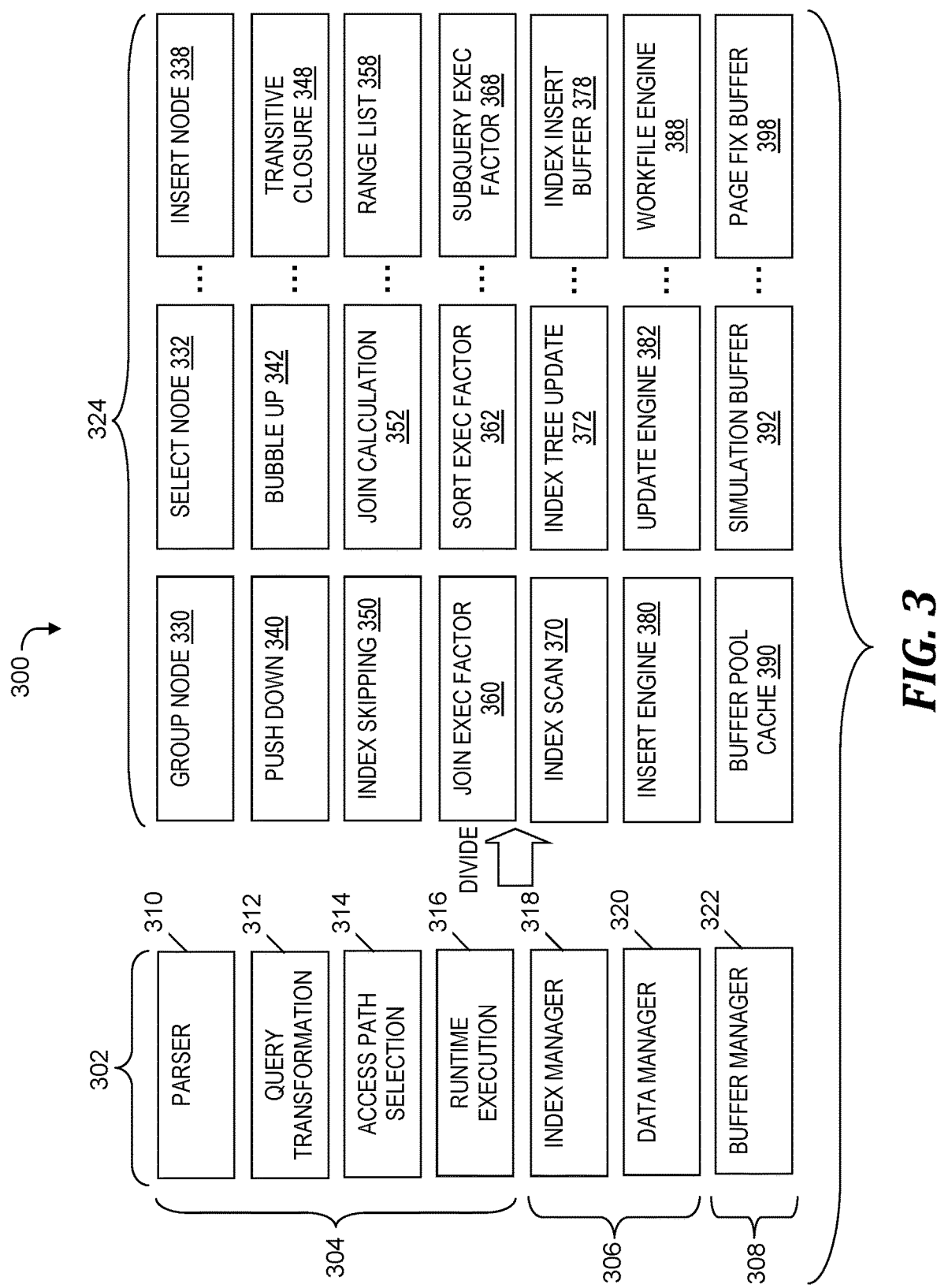
FIG. 3 is an example of dividing database system components into micro-systems within the process of FIG. 2, in accordance with embodiments of the present invention.

FIG. 3 is an example 300 of dividing database system components into micro-systems within step 202 in the process of FIG. 2, in accordance with embodiments of the present invention. Components 302 of database system 114 include database service components 304, data engine components 306, and a buffer pool component 308. Database service components 304 include a parser component 310, a query transformation component 312, an access path selection component 314, and a runtime execution component 316. Data engine components 306 include an index manager component 318 and a data manager component 320. Buffer pool component 308 includes a buffer manager component 322.

In step 202 (see FIG. 2), cloud database system resource optimization system 104 (see FIG. 1) divides components 302 into micro-systems 324 (i.e., services based on database functions). Parser component 310 divides into group node 330, select node 332, . . . , insert node 338. Query transformation component 312 divides into push down 340, bubble up 342, . . . , transitive closure 348. Access path selection component 314 divides into index skipping 350, join calculation 352, . . . , range list 358. Runtime execution component 316 divides into join exec factor 360, sort exec factor 362, . . . , subquery exec factor 368.

Index manager component 318 divides into index scan 370, index tree update 372, . . . , index insert buffer 378. Data manager component 320 divides into insert engine 380, update engine 382, . . . , workfile engine 388. Buffer manager component 322 divides into buffer pool cache 390, simulation buffer 392, . . . , page fix buffer 398.

Figure 4:
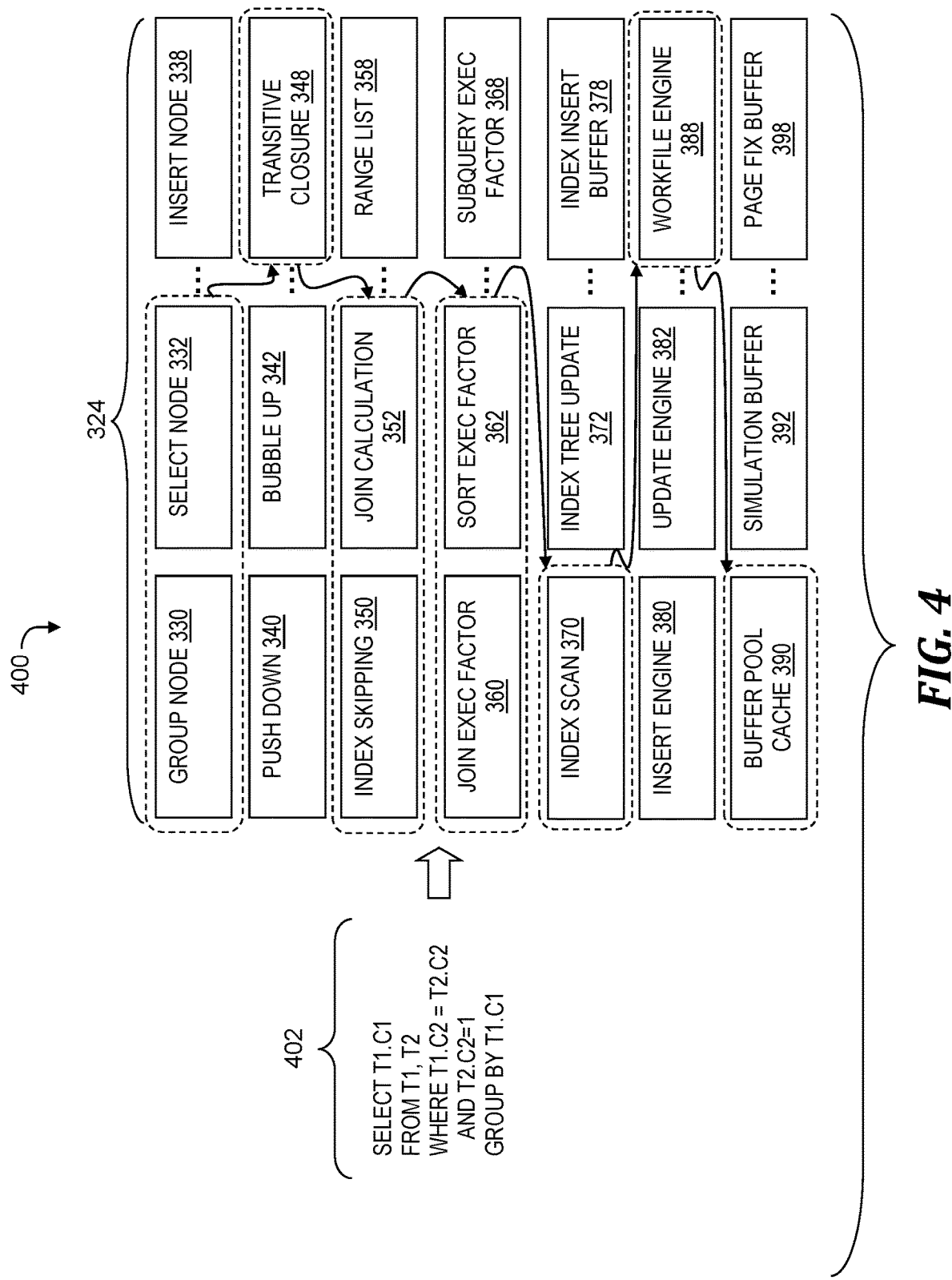
FIG. 4 is an example of processing an SQL query by the micro-systems resulting from the process of FIG. 3, in accordance with embodiments of the present invention.

FIG. 4 is an example 400 of processing an SQL query by the micro-systems resulting from the dividing process of FIG. 3, in accordance with embodiments of the present invention. Micro-systems 324 result from the dividing process of FIG. 3 and include parser micro-systems group node 330, select node 332, . . . , insert node 338; query transformation micro-systems push down 340, bubble up 342, . . . , transitive closure 348; access path selection micro-systems index skipping 350, join calculation 352, . . . , range list 358; runtime execution micro-systems join exec factor 360, sort exec factor 362, . . . , subquery exec factor 368; index manager micro-systems index scan 370, index tree update 372, . . . , index insert buffer 378; data manager micro-systems insert engine 380, update engine 382, . . . , workfile engine 388; and buffer manager micro-systems buffer pool cache 390, simulation buffer 392, . . . , page fix buffer 398.

An SQL query 402 is processed by a combination of micro-systems indicated by the dashed lines and in an order indicated by the arrows pointing from one dashed line to another dashed line. For example, cloud database system resource optimization system 104 (see FIG. 1) processes SQL query 402 by using the following services in order: group node 330, select node 332, transitive closure 348, index skipping 350, join calculation 352, join exec factor 360, sort exec factor 362, index scan 370, workfile engine 388, and buffer pool cache 390. The processing of SQL query 402 does not include a processing by all the micro-systems of any single component.

Figure 5:
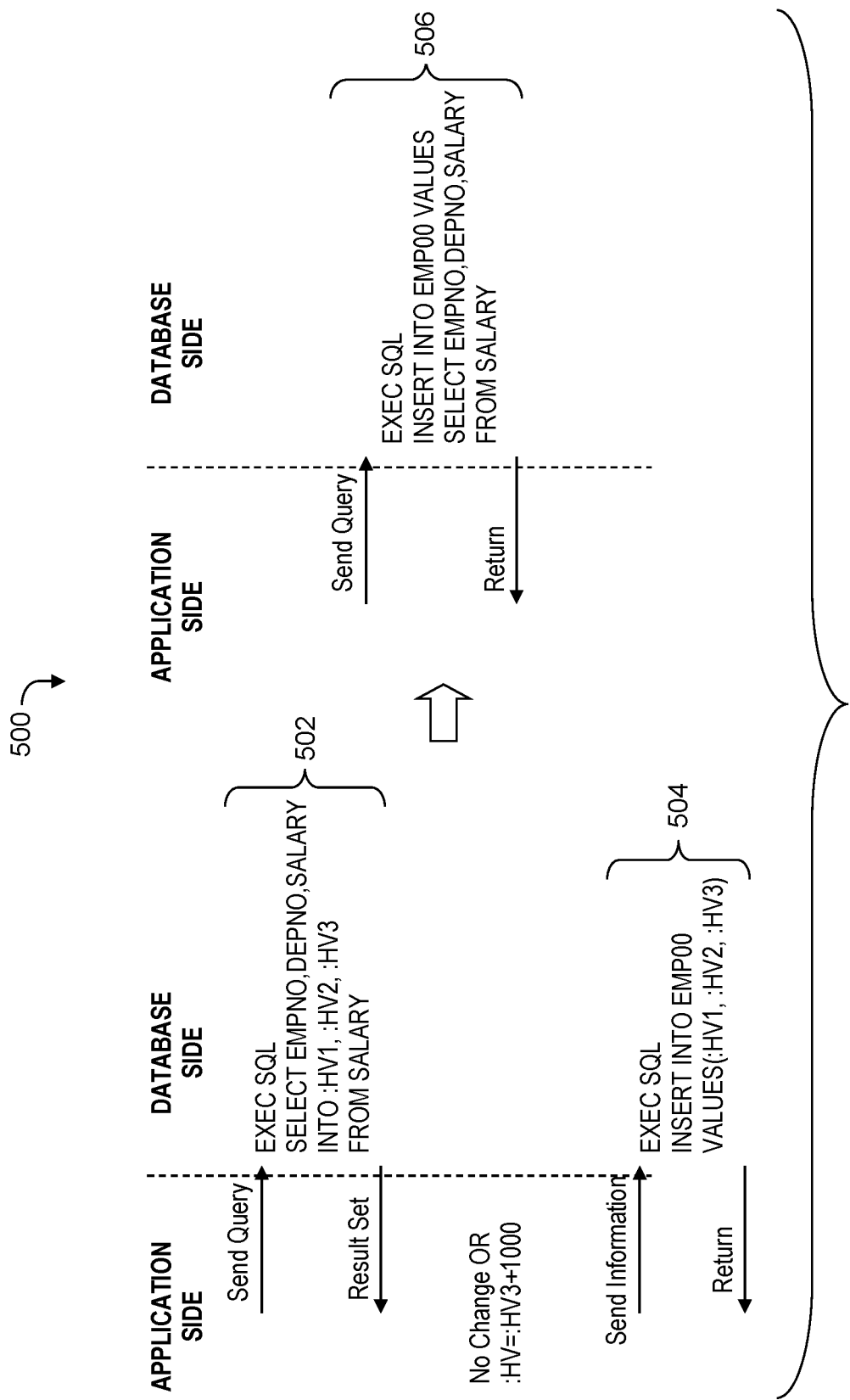
FIG. 5 is an example of performance architecture analytics in which SQL query functions are combined together within the process of FIG. 2, in accordance with embodiments of the present invention.

FIG. 5 is an example 500 of performance architecture analytics in which SQL query functions are combined together within the process of FIG. 2, in accordance with embodiments of the present invention. Example 500 includes a first query function 502 and a second query function 504. Using the performance architecture defined in step 216 (see FIG. 2) and the internal architecture analytics performed in step 216 (see FIG. 2), cloud database system resource optimization system 104 (see FIG. 1) combines first and second query functions 502 and 504 into a combined query function 506 in an internal query level of the performance architecture.

Figure 6:
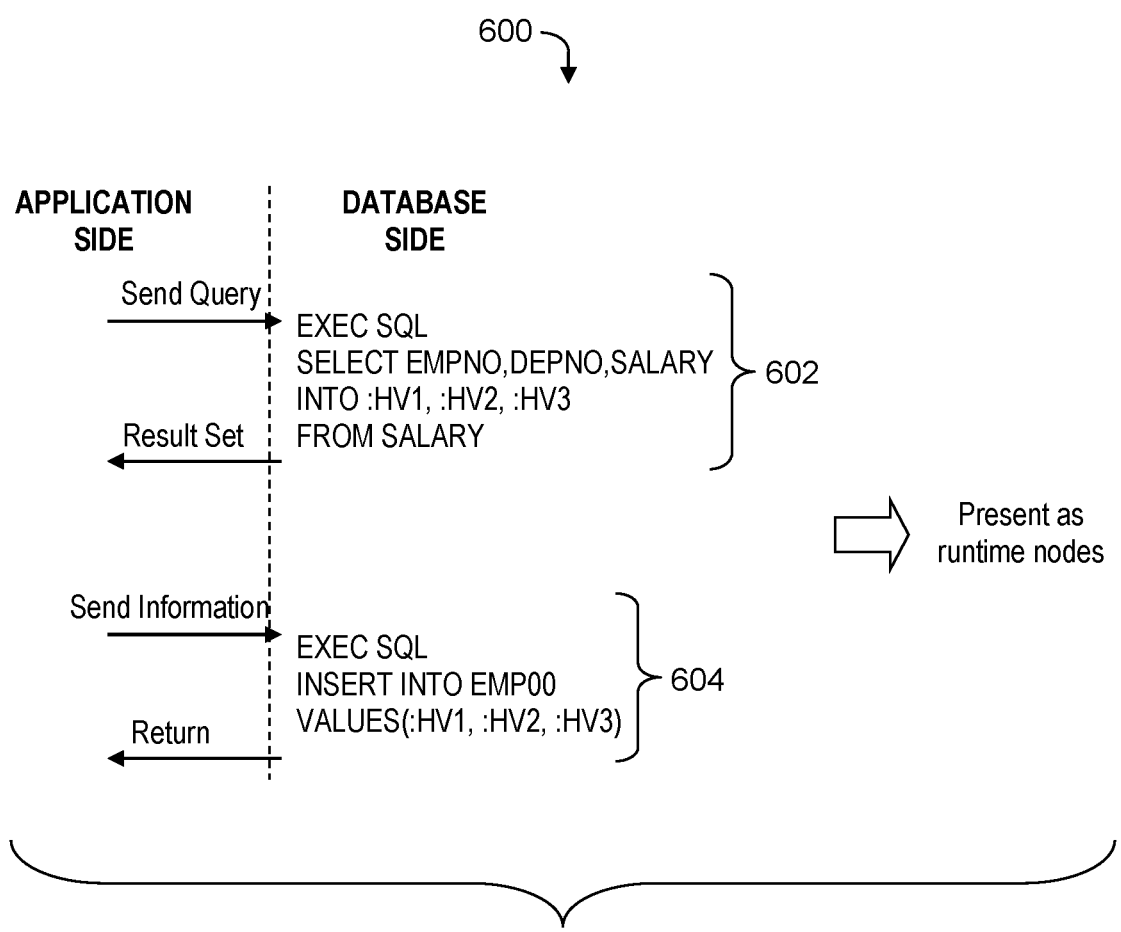
FIG. 6 is an example of performance architecture analytics in which SQL query functions cannot be combined and are presented as runtime nodes within the process of FIG. 2, in accordance with embodiments of the present invention.

FIG. 6 is an example 600 of performance architecture analytics in which SQL queries cannot be combined and are presented as runtime nodes within the process of FIG. 2, in accordance with embodiments of the present invention. Using the performance architecture defined in step 216 (see FIG. 2) and the internal architecture analytics performed in step 216 (see FIG. 2), cloud database system resource optimization system 104 (see FIG. 1) determines that first query function 602 and second query function 604 cannot be combined and in response thereto, presents first and second query functions 602 and 604 as runtime nodes in a runtime node level of the performance architecture.

Figure 7:
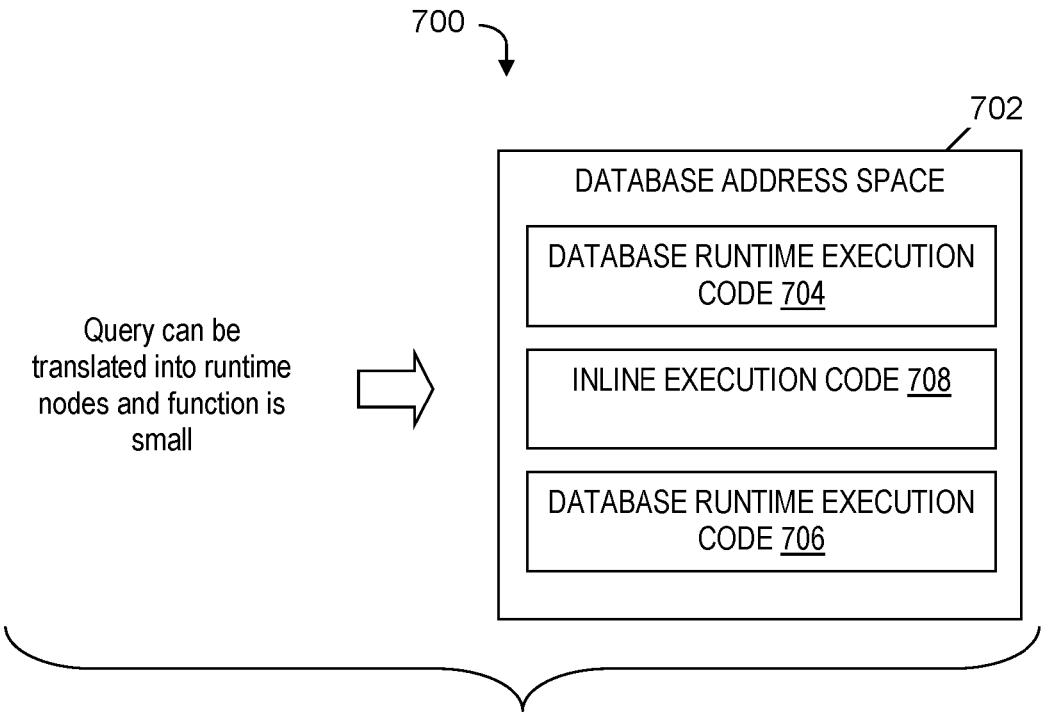
FIG. 7 is an example of performance architecture analytics in which an inline execution code of an SQL query is set into the same address space as database runtime execution code within the process of FIG. 2, in accordance with embodiments of the present invention.

FIG. 7 is an example 700 of performance architecture analytics in which an inline execution code of an SQL query is set into the same address space as database runtime execution code within the process of FIG. 2, in accordance with embodiments of the present invention. Example 700 includes a database address space 702 that includes database runtime execution code 704 and 706. In step 216 (see FIG. 2), cloud database system resource optimization system 104 (see FIG. 1) determines that a function of query 120 (see FIG. 1) can be translated into a runtime node and that the function is small (i.e., a measure of complexity of the function does not exceed a specified threshold amount). In response to determining that the function can be translated into the runtime node and that the function is small, cloud database system resource optimization system 104 (see FIG. 1) sets, at an inline code level of the performance architecture, an inline execution code 708 for the function in the same database address space 702 in which database runtime execution code 704 and 706 reside.

Figure 8:
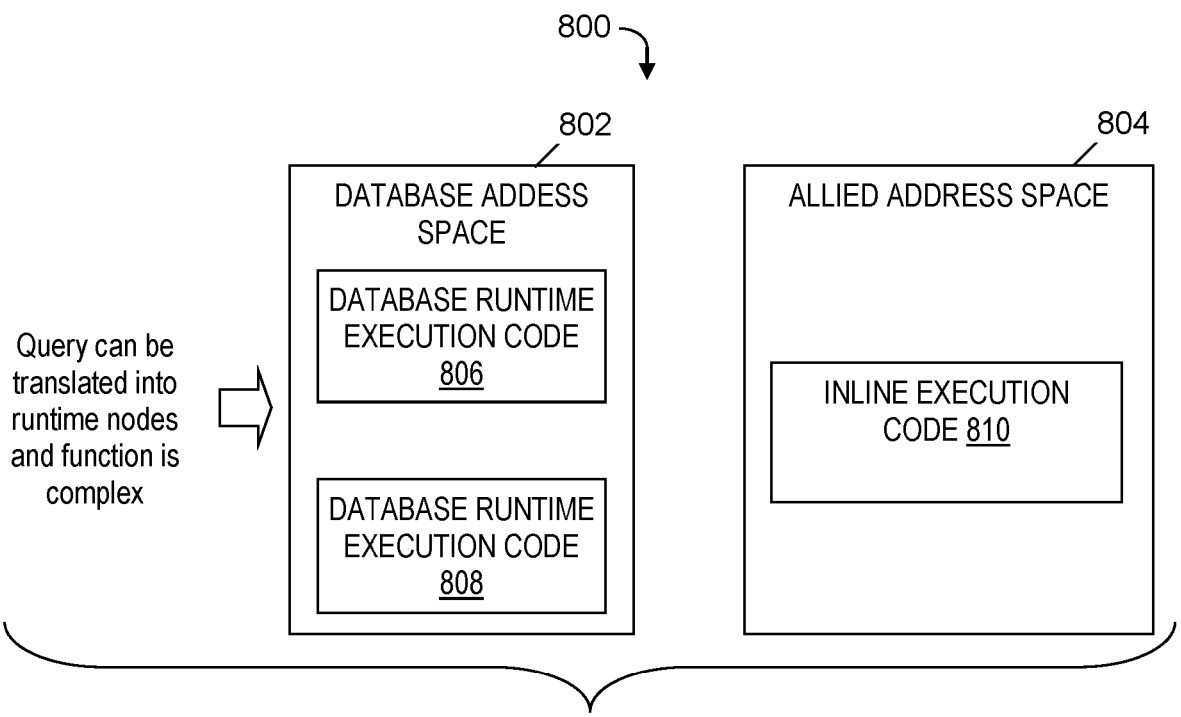
FIG. 8 is an example of performance architecture analytics in which an inline execution code of an SQL query is set into an allied address space that is different from the address space of the database runtime execution code within the process of FIG. 2, in accordance with embodiments of the present invention.

FIG. 8 is an example 800 of performance architecture analytics in which an inline execution code of an SQL query is set into an allied address space that is different from the address space of the database runtime execution code within the process of FIG. 2, in accordance with embodiments of the present invention. Example 800 includes a database address space 802 and an allied address space 804. Database address space 802 includes database runtime execution code 806 and 808. In step 216 (see FIG. 2), cloud database system resource optimization system 104 (see FIG. 1) determines that a function of query 120 (see FIG. 1) can be translated into a runtime node and that the function is complex (i.e., a measure of complexity of the function exceeds a specified threshold amount). In response to determining that the function can be translated into the runtime node and that the function is complex, cloud database system resource optimization system 104 (see FIG. 1) sets, at an outline code level of the performance architecture, an inline execution code 810 for the function in allied address space 804, which is different from the database address space 802 in which database runtime execution code 806 and 808 reside.

Figure 9:
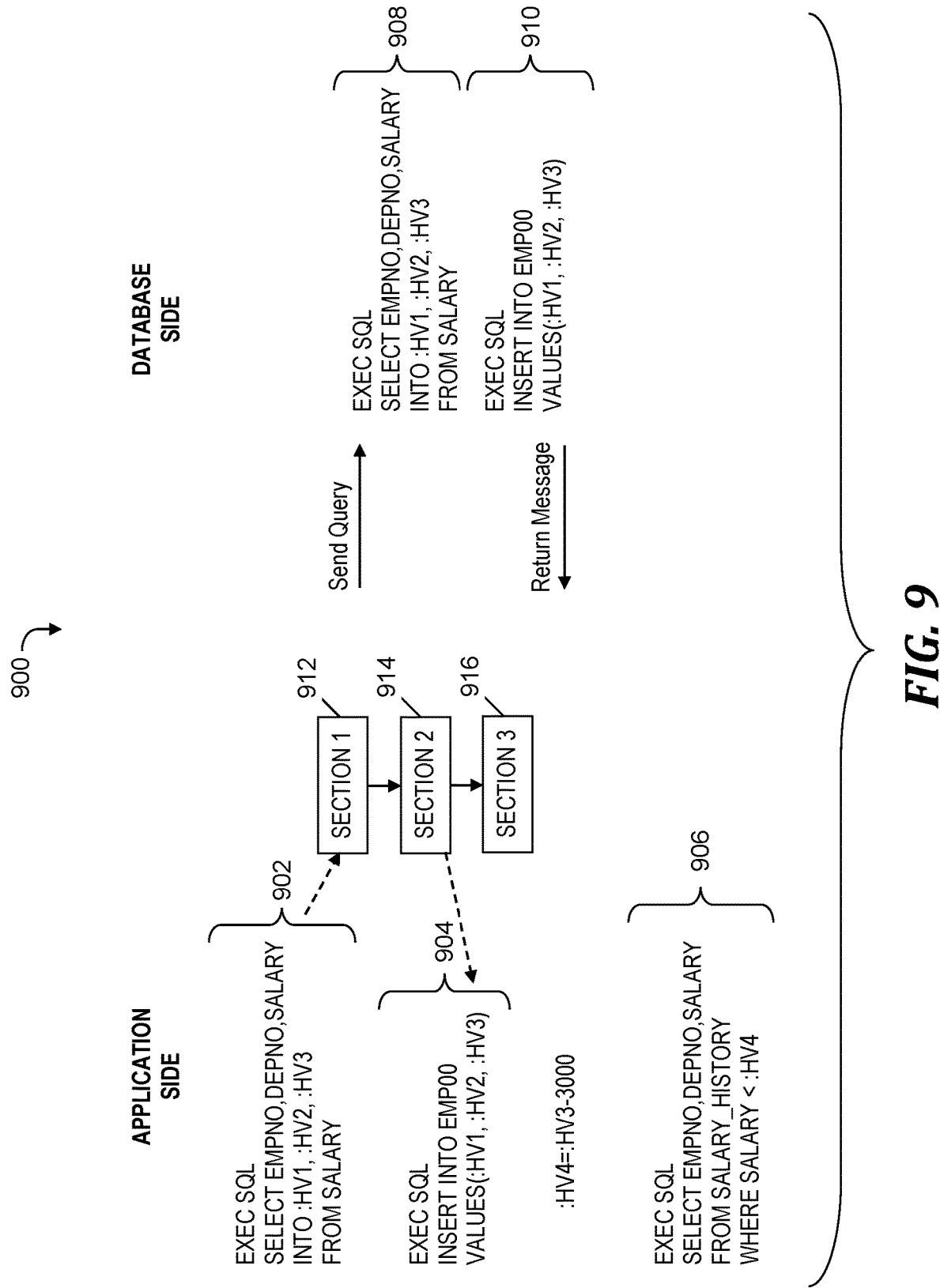
FIG. 9 is an example of building a query function protocol for execution of a partial query relation graph within the process of FIG. 2, in accordance with embodiments of the present invention.

FIG. 9 is an example 900 of building a query function protocol for execution of a partial query relation graph within the process of FIG. 2, in accordance with embodiments of the present invention. Example 900 includes SQL query functions 902, 904, and 906 on the application side and SQL query functions 908 and 910 on the database side. In step 220, cloud database system resource optimization system 104 (see FIG. 1) divides query function 902 into three execution units (i.e., section 912, section 914, and section 916). Cloud database system resource optimization system 104 (see FIG. 1) generates a query relation graph whose nodes include sections 912, 914, and 916. In step 220 (see FIG. 2), cloud database system resource optimization system 104 (see FIG. 1) determines the execution sequence within the query relation graph, including the sequence indicated by the arrow to section 912 and the arrow from section 912 to query function 904.

Computer System

Figure 10:
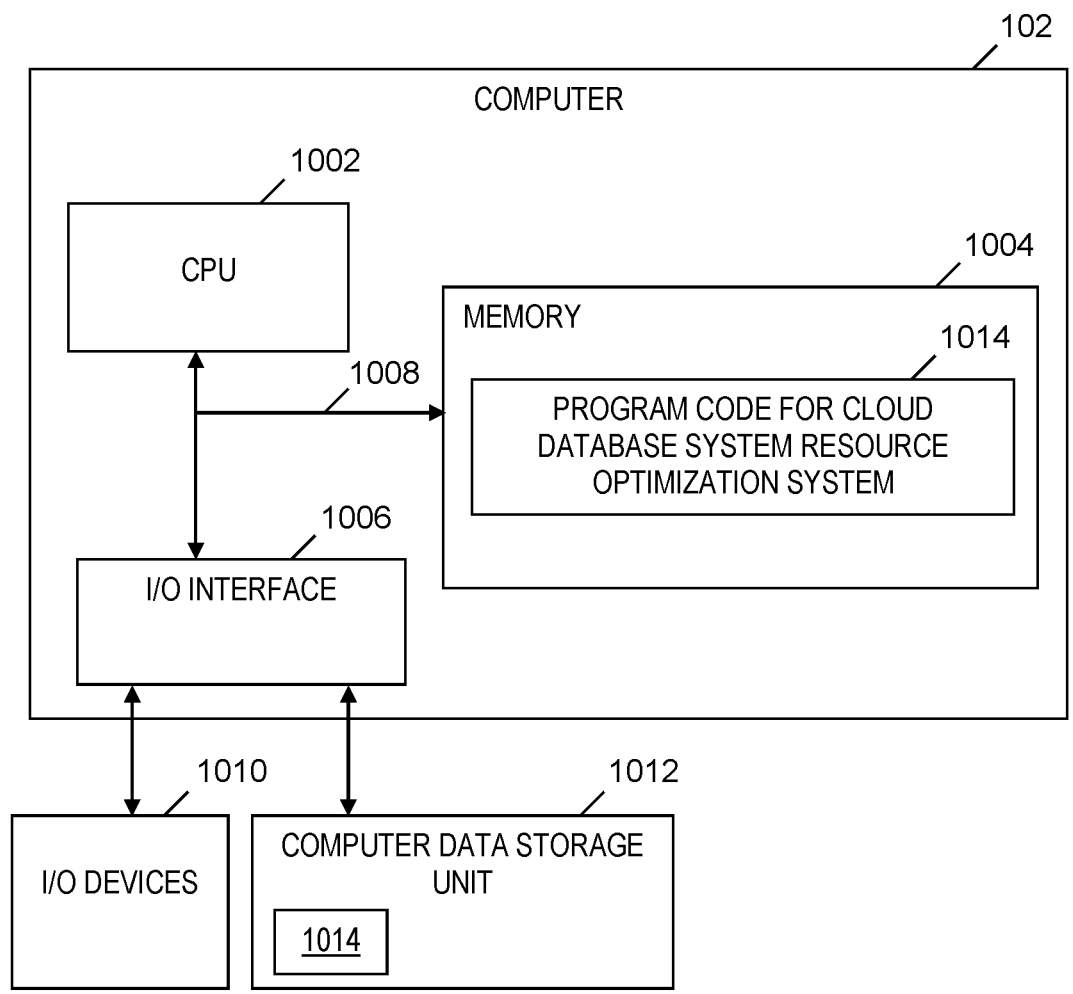
FIG. 10 is a block diagram of a computer that is included in the system of FIG. 1 and that implements the process of FIG. 2, in accordance with embodiments of the present invention.

FIG. 10 is a block diagram of a computer that is included in the system of FIG. 1 and that implements the process of FIG. 2, in accordance with embodiments of the present invention. Computer 102 is a computer system that generally includes a central processing unit (CPU) 1002, a memory 1004, an input/output (I/O) interface 1006, and a bus 1008. Further, computer 102 is coupled to I/O devices 1010 and a computer data storage unit 1012. CPU 1002 performs computation and control functions of computer 102, including executing instructions included in program code 1014 for cloud database system resource optimization system 104 (see FIG. 1) to perform a method of optimizing a system resource of a cloud database where workload patterns are stable, where the instructions are executed by CPU 1002 via memory 1004. CPU 1002 may include a single processing unit or processor or be distributed across one or more processing units or one or more processors in one or more locations (e.g., on a client and server).

Memory 1004 includes a known computer readable storage medium, which is described below. In one embodiment, cache memory elements of memory 1004 provide temporary storage of at least some program code (e.g., program code 1014) in order to reduce the number of times code must be retrieved from bulk storage while instructions of the program code are executed. Moreover, similar to CPU 1002, memory 1004 may reside at a single physical location, including one or more types of data storage, or be distributed across a plurality of physical systems or a plurality of computer readable storage media in various forms. Further, memory 1004 can include data distributed across, for example, a local area network (LAN) or a wide area network (WAN).

I/O interface 1006 includes any system for exchanging information to or from an external source. I/O devices 1010 include any known type of external device, including a display, keyboard, etc. Bus 1008 provides a communication link between each of the components in computer 102, and may include any type of transmission link, including electrical, optical, wireless, etc.

I/O interface 1006 also allows computer 102 to store information (e.g., data or program instructions such as program code 1014) on and retrieve the information from computer data storage unit 1012 or another computer data storage unit (not shown). Computer data storage unit 1012 includes one or more known computer readable storage media, where a computer readable storage medium is described below. In one embodiment, computer data storage unit 1012 is a non-volatile data storage device, such as, for example, a solid-state drive (SSD), a network-attached storage (NAS) array, a storage area network (SAN) array, a magnetic disk drive (i.e., hard disk drive), or an optical disc drive (e.g., a CD-ROM drive which receives a CD-ROM disk or a DVD drive which receives a DVD disc).

Memory 1004 and/or storage unit 1012 may store computer program code 1014 that includes instructions that are executed by CPU 1002 via memory 1004 to optimize a system resource of a cloud database where workload patterns are stable. Although FIG. 10 depicts memory 1004 as including program code, the present invention contemplates embodiments in which memory 1004 does not include all of code 1014 simultaneously, but instead at one time includes only a portion of code 1014.

Further, memory 1004 may include an operating system (not shown) and may include other systems not shown in FIG. 10.

As will be appreciated by one skilled in the art, in a first embodiment, the present invention may be a method; in a second embodiment, the present invention may be a system; and in a third embodiment, the present invention may be a computer program product.

Any of the components of an embodiment of the present invention can be deployed, managed, serviced, etc. by a service provider that offers to deploy or integrate computing infrastructure with respect to optimizing a system resource of a cloud database where workload patterns are stable. Thus, an embodiment of the present invention discloses a process for supporting computer infrastructure, where the process includes providing at least one support service for at least one of integrating, hosting, maintaining and deploying computer-readable code (e.g., program code 1014) in a computer system (e.g., computer 102) including one or more processors (e.g., CPU 1002), wherein the processor(s) carry out instructions contained in the code causing the computer system to optimize a system resource of a cloud database where workload patterns are stable. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of optimizing a system resource of a cloud database where workload patterns are stable.

While it is understood that program code 1014 for optimizing a system resource of a cloud database where workload patterns are stable may be deployed by manually loading directly in client, server and proxy computers (not shown) via loading a computer-readable storage medium (e.g., computer data storage unit 1012), program code 1014 may also be automatically or semi-automatically deployed into computer 102 by sending program code 1014 to a central server or a group of central servers. Program code 1014 is then downloaded into client computers (e.g., computer 102) that will execute program code 1014. Alternatively, program code 1014 is sent directly to the client computer via e-mail. Program code 1014 is then either detached to a directory on the client computer or loaded into a directory on the client computer by a button on the e-mail that executes a program that detaches program code 1014 into a directory. Another alternative is to send program code 1014 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 1014 is transmitted to the proxy server and then it is stored on the proxy server.

Another embodiment of the invention provides a method that performs the process steps on a subscription, advertising and/or fee basis. That is, a service provider can offer to create, maintain, support, etc. a process of optimizing a system resource of a cloud database where workload patterns are stable. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product at any possible technical detail level of integration. The computer program product may include a computer readable storage medium (or media) (i.e., memory 1004 and computer data storage unit 1012) having computer readable program instructions 1014 thereon for causing a processor (e.g., CPU 1002) to carry out aspects of the present invention.

The computer readable storage medium can be a tangible device that can retain and store instructions (e.g., program code 1014) for use by an instruction execution device (e.g., computer 102). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 1014) described herein can be downloaded to respective computing/processing devices (e.g., computer 102) from a computer readable storage medium or to an external computer or external storage device (e.g., computer data storage unit 1012) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 1014) for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIG. 2) and/or block diagrams (e.g., FIG. 1 and FIG. 10) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 1014).

These computer readable program instructions may be provided to a processor (e.g., CPU 1002) of a general purpose computer, special purpose computer, or other programmable data processing apparatus (e.g., computer 102) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 1012) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 1014) may also be loaded onto a computer (e.g. computer 102), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 11:
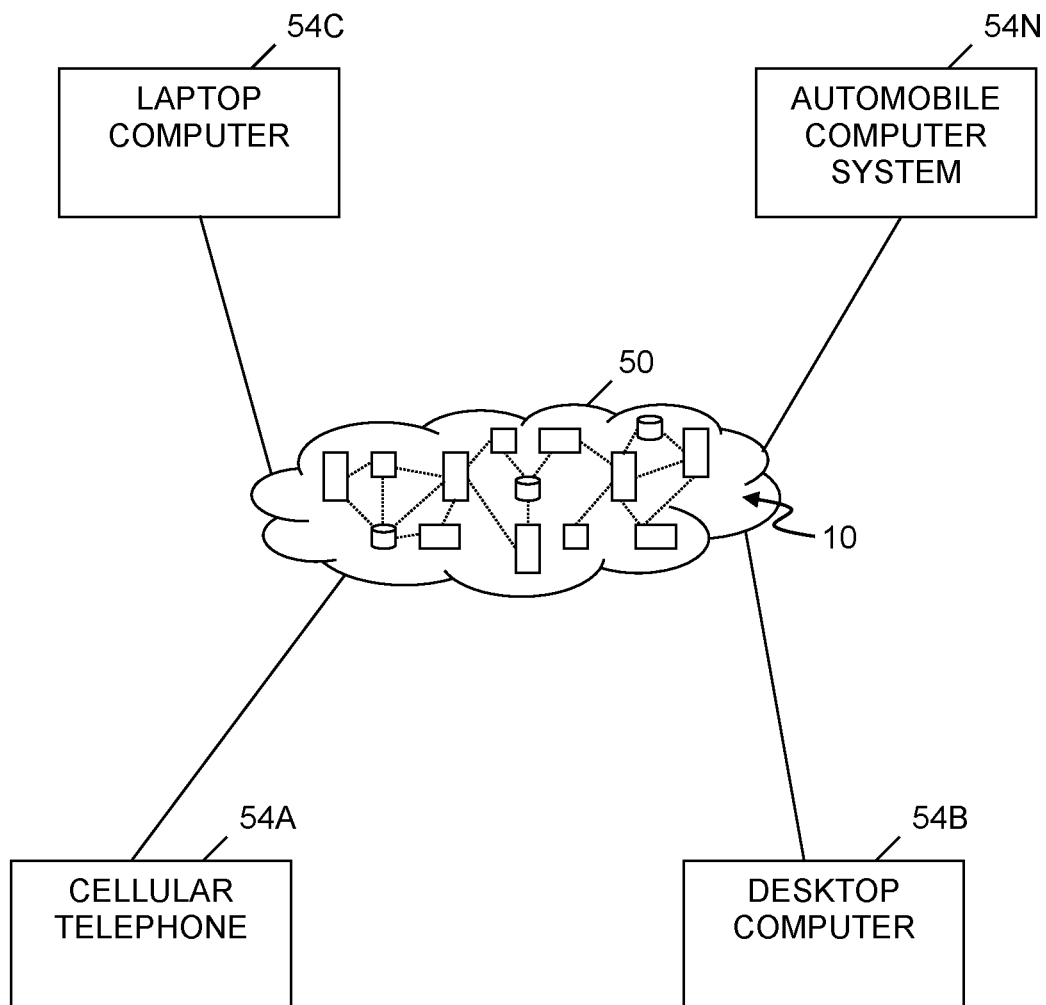
FIG. 11 depicts a cloud computing environment, in accordance with embodiments of the present invention.

Referring now to FIG. 11, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 11 are intended to be illustrative only and that computing nodes 10 and cloud computing environment 50 can communicate with any type of computerized device over any type of network and/or network addressable connection (e.g., using a web browser).

Figure 12:
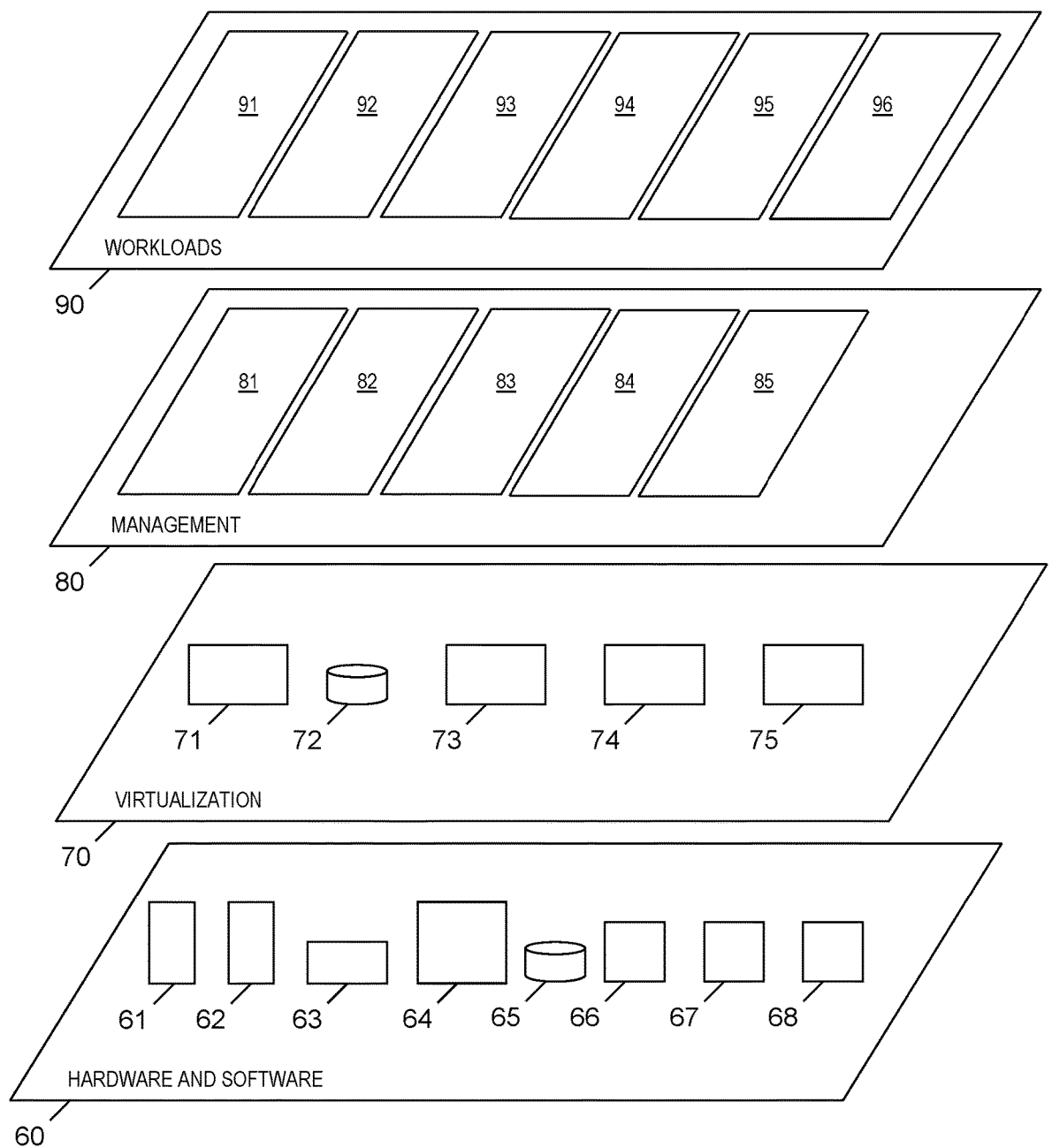
FIG. 12 depicts abstraction model layers, in accordance with embodiments of the present invention.

Referring now to FIG. 12, a set of functional abstraction layers provided by cloud computing environment 50 (see FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and optimization of a system resource for a cloud database for which a workload pattern is stable 96.

What is claimed is:

1. A computer system comprising:
   a central processing unit (CPU);
   a memory coupled to the CPU; and
   one or more computer readable storage media coupled to the CPU, the one or more computer readable storage media collectively containing instructions that are executed by the CPU via the memory to implement a method of optimizing a system resource of a cloud database where workload patterns are stable, the method comprising:
   the computer system dividing components of a database system into micro-systems according to functions and execution levels of the database system, the components being divided into respective multiple micro-systems;
   the computer system performing a cluster analysis of the micro-systems and an analysis of SQL workload patterns;
   based on the cluster analysis and the analysis of SQL workload patterns, the computer system generating different combinations of the micro-systems;
   the computer system generating images of the micro-systems and of the different combinations of the micro-systems;
   the computer system receiving an SQL query and analyzing the SQL query at a current layer specifying a set of micro-systems specified by a function of the database system;
   the computer system pre-loading and activating one or more services associated with one or more micro-systems specified by one or more next layers; and
   the computer system performing a partial execution of the SQL query and generating a result of the SQL query at an edge side or at a client side, wherein a selection of the edge side or the client side for the performing the partial execution of the SQL query and for the generating the result of the SQL query is based on the analysis of the SQL workload patterns.

2. The computer system of claim 1, wherein the method further comprises:
the computer system building the micro-systems as respective images and loading the respective images into containers for execution.

3. The computer system of claim 2, wherein the method further comprises:
the computer system enhancing a performance of an execution of the SQL query by pre-loading the respective images asynchronously, the enhanced performance being based on the cluster analysis and SQL execution signatures probability.

4. The computer system of claim 1, wherein the dividing the components of the database system includes dividing the components into the respective multiple micro-systems based on actual usage statistics.

5. The computer system of claim 1, wherein the method further comprises:
the computer system performing an internal architecture analytics on an execution of the SQL query for a calculation of a benefit to a performance of the execution;
based on the internal architecture analytics, the computer system combining functions of the SQL query on an internal query level; and
based on the internal architecture analytics, the computer system determining that functions of a second SQL query cannot be combined on the internal query level and in response thereto, the computer system presenting the functions of the second SQL query as runtime nodes on a runtime node level.

6. The computer system of claim 1, wherein the method further comprises:
the computer system determining that functions of the SQL query can be translated into runtime nodes;
the computer system determining that a function included in the functions has a level of complexity that does not exceed a threshold amount; and
in response to the determining that the functions can be translated into runtime nodes and the determining that the function has the level of complexity that does not exceed the threshold amount, the computer system setting, at an inline code level, inline execution code for the function in an address space in which runtime execution code of the database system resides.

7. The computer system of claim 1, wherein the method further comprises:
the computer system determining that functions of the SQL query can be translated into runtime nodes;
the computer system determining that a function included in the functions has a level of complexity that exceeds a threshold amount; and
in response to the determining that the functions can be translated into runtime nodes and the determining that the function has the level of complexity that exceeds the threshold amount, the computer system setting, at an outline code level, inline execution code for the function in allied address space that is different from an address space in which runtime execution code of the database system resides.

8. The computer system of claim 1, wherein the method further comprises:
the computer system dividing the SQL query into sections which are execution units;
the computer system generating a query relation graph whose nodes are the execution units and which includes a representation of relationships between the sections;
the computer system generating sub-query relation graphs based on the relationships; and
based on the sub-query relation graphs, the computer system determining deep relationships.

9. The computer system of claim 8, wherein the method further comprises:
the computer system providing a query function protocol for a partial execution of the query relation graph;
the computer system determining an execution sequence within a portion of the query relation graph; and
the computer system using the query function protocol to perform the execution sequence.

10. A computer program product for optimizing a system resource of a cloud database where workload patterns are stable, the computer program product comprising:
one or more computer readable storage media having computer readable program code collectively stored on the one or more computer readable storage media, the computer readable program code being executed by a central processing unit (CPU) of a computer system to cause the computer system to perform a method comprising:
the computer system dividing components of a database system into micro-systems according to functions and execution levels of the database system, the components being divided into respective multiple micro-systems;
the computer system performing a cluster analysis of the micro-systems and an analysis of SQL workload patterns;
based on the cluster analysis and the analysis of SQL workload patterns, the computer system generating different combinations of the micro-systems;
the computer system generating images of the micro-systems and of the different combinations of the micro-systems;
the computer system receiving an SQL query and analyzing the SQL query at a current layer specifying a set of micro-systems specified by a function of the database system;
the computer system pre-loading and activating one or more services associated with one or more micro-systems specified by one or more next layers; and
the computer system performing a partial execution of the SQL query and generating a result of the SQL query at an edge side or at a client side, wherein a selection of the edge side or the client side for the performing the partial execution of the SQL query and for the generating the result of the SQL query is based on the analysis of the SQL workload patterns.

11. The computer program product of claim 10, wherein the method further comprises:
the computer system building the micro-systems as respective images and loading the respective images into containers for execution.

12. The computer program product of claim 11, wherein the method further comprises:
the computer system enhancing a performance of an execution of the SQL query by pre-loading the respective images asynchronously, the enhanced performance being based on the cluster analysis and SQL execution signatures probability.

13. The computer program product of claim 10, wherein the dividing the components of the database system includes dividing the components into the respective multiple micro-systems based on actual usage statistics.

14. The computer program product of claim 10, wherein the method further comprises:
- the computer system performing an internal architecture analytics on an execution of the SQL query for a calculation of a benefit to a performance of the execution;
- based on the internal architecture analytics, the computer system combining functions of the SQL query on an internal query level; and
- based on the internal architecture analytics, the computer system determining that functions of a second SQL query cannot be combined on the internal query level and in response thereto, the computer system presenting the functions of the second SQL query as runtime nodes on a runtime node level.

15. The computer program product of claim 10, wherein the method further comprises:
- the computer system determining that functions of the SQL query can be translated into runtime nodes;
- the computer system determining that a function included in the functions has a level of complexity that does not exceed a threshold amount; and
- in response to the determining that the functions can be translated into runtime nodes and the determining that the function has the level of complexity that does not exceed the threshold amount, the computer system setting, at an inline code level, inline execution code for the function in an address space in which runtime execution code of the database system resides.

16. The computer program product of claim 10, wherein the method further comprises:
- the computer system determining that functions of the SQL query can be translated into runtime nodes;
- the computer system determining that a function included in the functions has a level of complexity that exceeds a threshold amount; and
- in response to the determining that the functions can be translated into runtime nodes and the determining that the function has the level of complexity that exceeds the threshold amount, the computer system setting, at an outline code level, inline execution code for the function in allied address space that is different from an address space in which runtime execution code of the database system resides.

17. A computer-implemented method comprising:
- dividing, by one or more processors, components of a database system into micro-systems according to functions and execution levels of the database system, the components being divided into respective multiple micro-systems;
- performing, by the one or more processors, a cluster analysis of the micro-systems and an analysis of SQL workload patterns;
- based on the cluster analysis and the analysis of SQL workload patterns, generating, by the one or more processors, different combinations of the micro-systems;
- generating, by the one or more processors, images of the micro-systems and of the different combinations of the micro-systems;
- receiving, by the one or more processors, an SQL query and analyzing the SQL query at a current layer specifying a set of micro-systems specified by a function of the database system;
- pre-loading, by the one or more processors, and activating, by the one or more processors, one or more services associated with one or more micro-systems specified by one or more next layers; and
- performing, by the one or more processors, a partial execution of the SQL query and generating, by the one or more processors, a result of the SQL query at an edge side or at a client side, wherein a selection of the edge side or the client side for the performing the partial execution of the SQL query and for the generating the result of the SQL query is based on the analysis of the SQL workload patterns.

18. The method of claim 17, further comprising:
- building, by the one or more processors, the micro-systems as respective images and loading the respective images into containers for execution.

19. The method of claim 18, further comprising:
- enhancing, by the one or more processors, a performance of an execution of the SQL query by pre-loading the respective images asynchronously, the enhanced performance being based on the cluster analysis and SQL execution signatures probability.

20. The method of claim 17, wherein the dividing the components of the database system includes dividing the components into the respective multiple micro-systems based on actual usage statistics.

* * * * *